Nov. 3, 1970  J. J. BURNES  3,537,141
MOLD DOSAGE MECHANISM

Filed March 25, 1968  3 Sheets-Sheet 1

INVENTOR
JAMES J. BURNES
BY
ATTORNEY

United States Patent Office 3,537,141
Patented Nov. 3, 1970

3,537,141
MOLD DOSAGE MECHANISM
James J. Burnes, Southbury, Conn., assignor to Vitramon,
Incorporated, Monroe, Conn., a corporation of Delaware
Filed Mar. 25, 1968, Ser. No. 715,759
Int. Cl. B29f 1/00
U.S. Cl. 18—30          10 Claims

ABSTRACT OF THE DISCLOSURE

The present invention concerns itself with a dosage device for a plastic molding press. More particularly, the present invention is directed to improved apparatus for cleaning the loading tube and pot of the dosage device between operating cycles of the press and to concurrently removing the finished piece and resulting cull from the mold plates.

---

Molding presses of the type herein described are essentially comprised of a pair of interacting heated press plates. The first, or cavity plate, having one or more stationary molds; and, the second, or stripper plate having a series of plungers which periscope through openings in the stripper plate to fit into the cavity plate molds and cooperate with the cavity plate molds to form the plastic material into the desired shape. A dosage device, positioned above the cavity plate, has a hopper adjacent the cavity plate molds, a pot, and a loading tube intermediate the hopper and the pot. A cooperating injection ram, positioned to slide through the pot, forces the granular plastic material being fed from the hopper through the loading tube into the pot, from the pot through a series of nozzles and into the molds. The movement of the injection ram and the stripper plate are timed such that, as the granular material flows through the loading tube and is deposited in the pot, the injection ram and stripper plate are beginning to move toward each other; the plastic material and the stripper plate plungers entering the mold cavity almost simultaneously. The interaction of the heat and pressure in the mold cavity then causes the plastic to form the desired shape. At the completion of the molding cycle, the stripper plate disengages, moving away from the cavity plate, and the plungers retract into the stripper plate to drop the finished pieces onto a receiving deck.

At this point in the operating cycle two major problems are present. The first, which is due to the inherent nature of the plastic material, is a gradually increasing build-up of plastic material along the walls of the dosage device loading tube. The plastic feed material used in operations of this type always contains a significant proportion of finer particles, somewhat on the consistency of flour, mixed in with the larger, more desirous particles. It should be understood at this point that because of the relatively short time span between molding sequences the press plates do not cool down after each operating cycle. Instead, they remain at, or close to, the molding temperature of the plastic material being used. As a result heat is quickly transferred from the cavity plate, through the adjacent pot, to the loading tube, so that the finer particles of plastic material, which are particularly subject to the immediate effects of the heat in the loading tube, begin to conglomerate and particles of plastic material adhere to the walls of the loading tube. Practical operating experience has shown that within a few hours of operation the build-up on the walls of the tube becomes so thick that it bridges and completely closes the loading tube. This necessitated an expensive and time consuming shut down to dismantle the dosage device and free the loading tube.

The second problem centers about removing the finished pieces from the stripper plate once the plungers have retracted into the stripper plate. Theoretically, once the plungers are removed from the finished pieces, the finished pieces are supposed to drop, under the influence of gravity, onto a receiving deck. As a practical matter, however, more often than not, the pieces will continue to adhere to the stripper plate and completely foul the next operating cycle. Similarly, the cull, i.e., the excess plastic material which is retained in the pot or mold nozzles after the injection ram is fully extended, often adheres to the ram instead of dropping into a scrap hopper, also fouling the next operating cycle.

It is therefore the primary object of the present invention to overcome the above enumerated problems and insure uninterrupted operation of the dosage device and molding press. As described in greater detail hereinafter, applicant accomplishes this objective by a combination of interacting elements which together cooperate to concurrently scrape clean the loading tube, eject the conglomerated residue deposited in the pot, disengage the finished pieces from the stripper plate and remove the cull from the injection ram. In addition, each of the elements in this unique arrangement is either operated or activated by a central fluid actuated piston so that a single pass of the piston completes the entire cleaning sequence. In this manner, the cleaning sequence is accomplished in a minimum of elapsed time, occupies a minimum of machine space and operates at a minimum cost.

It is therefore another object of the present invention to clean the loading tube of a molding press dosage device as an integral part of each mold press operating cycle.

It is yet another object of the present invention to clean the loading tube of a molding press dosage device by a combination of mechanical and fluid means.

It is still another object of the present invention to provide apparatus for a molding press to simultaneously remove the finished pieces from the stripper plate and the cull from the injection ram.

It is still a further object of the present invention to provide apparatus for a molding press to simultaneously clean the dosage device, remove the finished pieces from the stripper plate and remove the cull from the injection ram.

The subject matter which applicant regards as his invention is particularly pointed out and distinctly claimed in the concluding portion of this specification. The invention, however, as to its organization and method of operation together with further objects and advantages thereof will best be understood by reference to the following description taken in conjunction with the accompanying drawings, in which:

Figure 1:
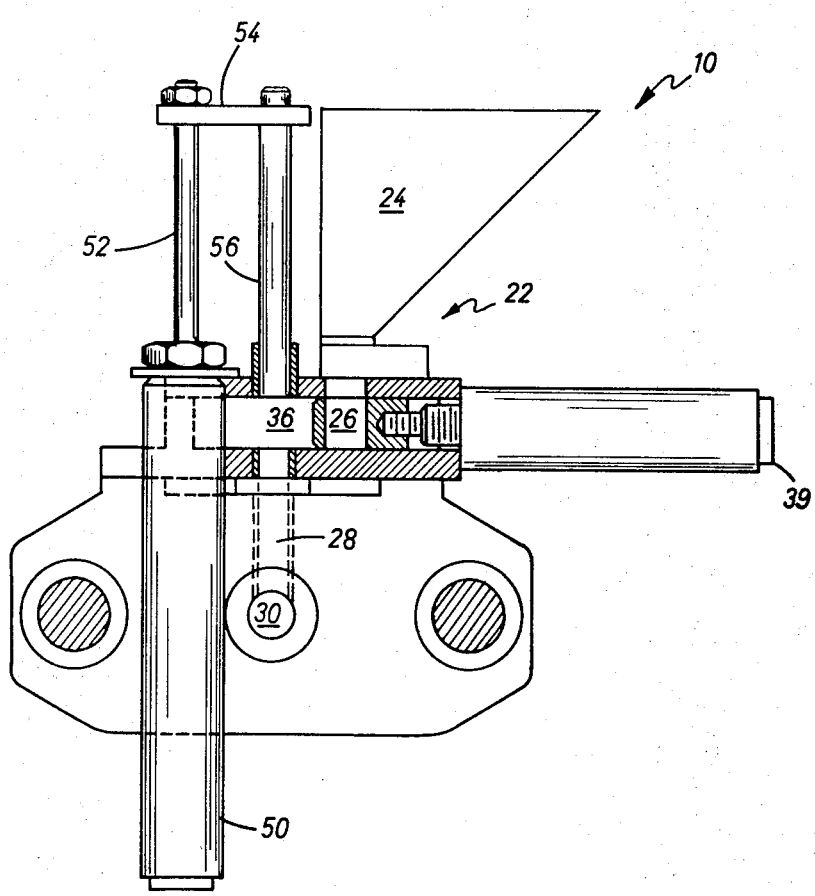
FIG. 1 is a front view of a molding press incorporating the improvements of the present invention.

Referring now to the drawings, there is shown a molding press, indicated generally at 10, having a stripper plate 12 mounted by spring loaded support pins 14 on an hydraulically actuated ram 16; a stationary cavity plate 18 having a series of molds 20; and, a dosage device 22 to feed measured amounts of granular plastic material to the molds 20. The dosage device 22 comprises a hopper 24, a feed regulator 26, a load tube 28, a pot 30 and an injection ram 32. In operation, the sequence begins with the feed regulator 26 positioned immediately below hopper 24 to receive a charge of the granular plastic material. On a signal, which is timed to coincide with the filling of the feed regulator 26, hydraulically actuated piston 34 slides the feed regulator in shaft 36 until the feed regulator overlies the upper end of the load tube 28, to discharge its contents into the load tube. As the charge is transferred through load tube 28 and deposited in pot 30, piston 34 returns feed regulator 26 to its start position, beneath the hopper 24, to receive another charge of plastic material.

At this point, injection ram 32 receives a signal to begin its cycle of operation. The injection ram is actuated preferably by a solenoid (not shown) sliding into the pot 30 and forcing the plastic material through nozzles 38 into the molds 20 in cavity plate 18. Almost simultaneously, hydraulically actuated ram 16 moves stripper plate 12 against the cavity plate 18. A series of plungers 40, one for each mold in the cavity plate 18, projects outwardly from the face 42 of hydraulically actuated ram 16; and, the stripper plate 12 has a series of corresponding openings (not shown) in the path of the plungers, such that as ram 16 continues its forward motion, stripper plate 12 slides back on spring-loaded support pins 14 and plungers 40 pass through the openings in the stripper plate and into the molds in cavity plate 18. In this manner the plungers 40 and the molds 20 cooperate to give the finished pieces the desired shape. Heat is then applied to the plates and the interaction of heat and pressure combine to set the plastic and complete the molding step. Hydraulic ram 16 and injection ram 32 are then reactuated to return to their original position and release the finished pieces onto a receiving deck. As soon as hydraulic ram 16 is clear of cavity plate 18, the spring-loaded support pins 14 move the stripper plate back toward the cavity plate, thereby withdrawing the plungers 40 from the finished pieces.

During this above described sequence two major problems created considerable operating difficulties. The first concerned the steady build-up of conglomerated plastic material along the walls of the load tube 28. It was found that the heat in the tube, transferred to the tube from the cavity plate, was sufficient to cause the finer particles of plastic feed material to conglomerate and adhere to the walls of the tube. Operating data has disclosed that this problem became acute after only a few hours of operation; the adhering plastic bridging and completely shutting off the flow of feed material through the load tube. It thus became necessary to discontinue operation and dismantle the dosage device, a time consuming and expensive procedure. The second problem, which was equally as significant, was caused by the finished pieces adhering to the stripper plate and the cull, i.e., the excess plastic material which is retained in the pot 30 or nozzles 40 after the injection ram 32 is fully extended, adhering to the injection ram 32, instead of dropping into their respective receiving stations (not shown).

Applicant addressed himself to this problem and as will presently be shown he has solved these problems by a combination of cooperating elements which simultaneously clean the loading tube, remove the finished pieces from the stripper plate and remove the cull from the injection ram. This novel combination is centered about and actuated by an air ram 50 having a rod 52 which extends to and, in turn, actuates a yoke 54. Suspended and fixedly attached to the yoke 54 are a cleaning rod 56, which slides in load tube 28, a stripper plate scraper blade 58 and an injection ram scraper blade 60. The cleansing sequence is initiated by a signal generated from the stripper plate that it is in the open position shown in FIGS. 2 and 3. The open-position signal actuates air ram 50, drawing the cleaning rod 56, and scraper blades 58 and 60 downwardly to thereby remove any residue adhering to the walls of the load tube 28 and scrape the finished pieces off of the stripper plate and the cull off of the injection ram.

Figure 2:
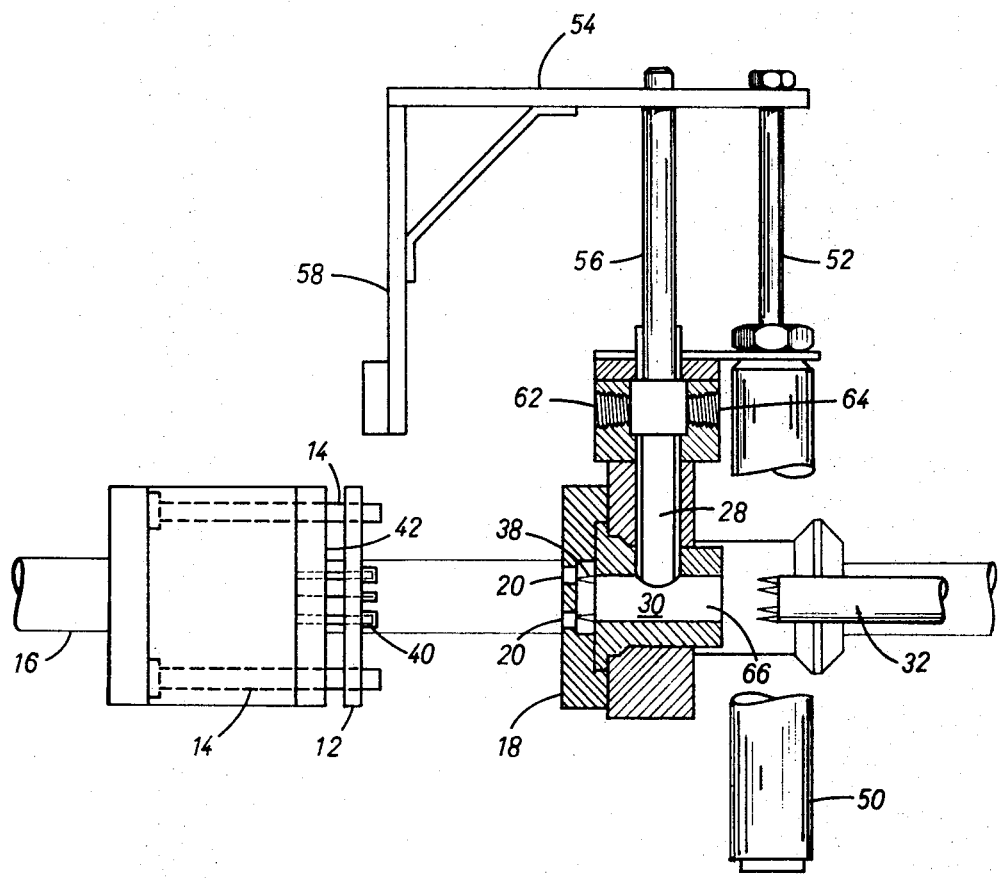
FIG. 2 is a view taken from one side of the molding press of FIG. 1 and incorporating the improvements of the present invention.
Figure 3:
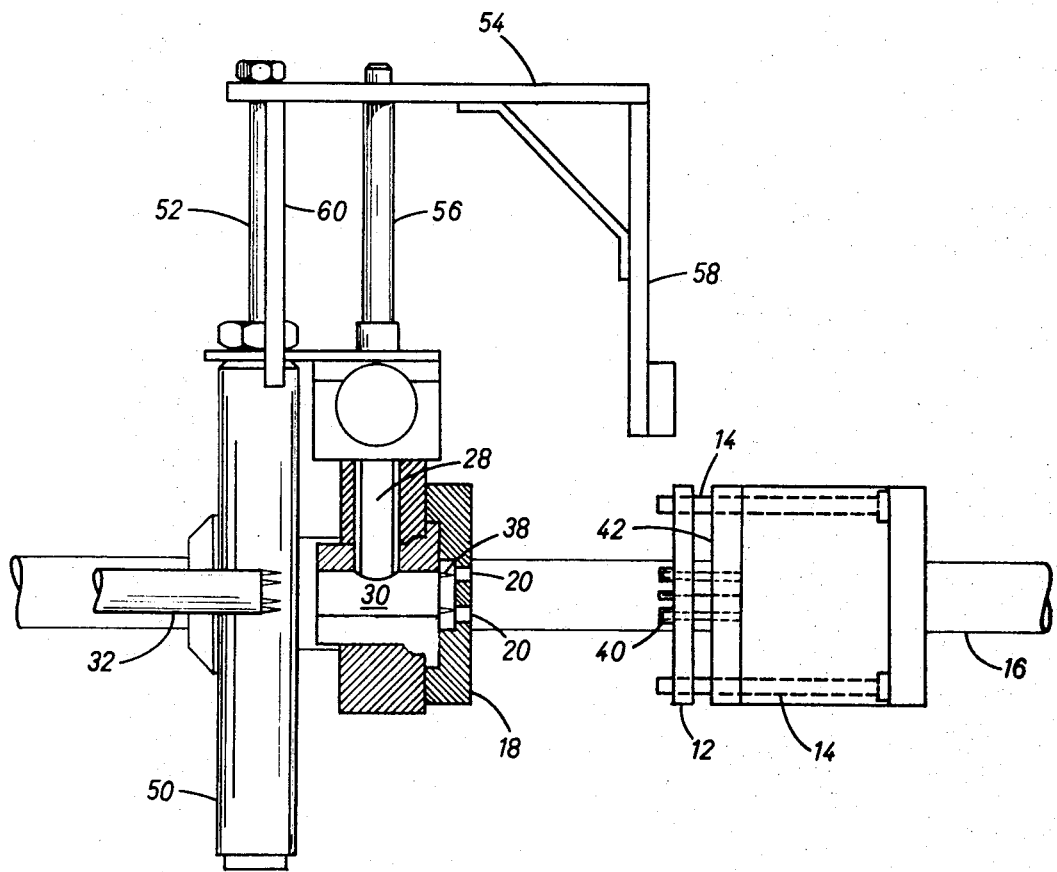
FIG. 3 is a view taken from the other side of the molding press of FIG. 1 and incorporating the improvements of the present invention.

Applicant found, however, that the action of the cleaning rod 56, in the above configuration had a serious disadvantage in that it deposited the unwanted and deleterious residue in the pot 30, directly in the path of injection ram 32. The problem, then, was how to retain the benefits accruing from the simplicity and economy of action of his moulding press cleaning arrangement while removing the undesirous load tube residue. His solution is an air injection system which cooperates with the cleaning rod 56 to blow the collected residue out of the pot before the injection ram begins its next cycle. As shown in FIG. 2, two air vents 62, 64 one on either side of the load tube, discharge a blast of air into the load tube, immediately after the cleaning rod has completed its operating cycle, to blow the residue out of the open end 66 of the pot 30. For further simplicity of operation and to attain the maximum possible effect from the air blast, applicant has found it advantageous to begin the air blast on the same signal that actuates the air ram 50 and starts the cleaning cycle. In this manner, in the time it takes the cleaning rod 56 to descend into the load tube and then rise back out of the tube a back pressure has been created in the air vents 62, 64 which enhances the effect of the air blast in removing the collected residue.

As this invention may be embodied in several forms without departing from the spirit or essential characteristics thereof, the present embodiment is illustrative and not restrictive. The scope of the invention is defined by the appended claims rather than by the description preceding them, and all embodiments which fall within the meaning and range of equivalency of the claims are, therefore, intended to be embraced by those claims.

I claim:

1. A molding press comprising a cavity plate having at least one mold; a stripper plate movable into and out of engagement with the cavity plate; a hopper; means to receive a measured charge of plastic material from the hopper; a pot positioned below the means to receive a measured charge and adjacent the cavity plate mold; a load tube intermediate the pot and the means to receive a measured charge to transfer the charge from the last mentioned means to the pot; and, an injection ram to move into and out of the pot to force the charge from the pot into the cavity plate mold; wherein the improvement comprises a load tube cleaning ram which descends into the load tube on a predetermined signal to scrape accumulated residue from the load tube walls after the charge has passed through the load tube and the injection ram has moved out of the pot.

2. A molding press as defined in claim 1 wherein the improvement further comprises means to inject a fluid into the load tube after the cleaning ram has withdrawn from the load tube and before the injection ram re-enters the pot, to eject from the pot the scraped residue deposited in the pot by the cleaning ram.

3. A molding press as defined in claim 1 wherein the improvement further comprises a stripper plate scraping blade connected to the cleaning ram to move in concert with the cleaning ram and remove the finished pieces adhering to the stripper plate as the cleaning ram descends into the load tube.

4. A molding press as defined in claim 1 wherein the improvement further comprises an injection ram scraping blade connected to the cleaning ram to move in concert with the cleaning ram and remove the cull adhering to the injection ram as the cleaning ram descends into the load tube.

5. A molding press as defined in claim 2 wherein the improvement further comprises a stripper plate scraping blade connected to the cleaning ram to move in concert with the cleaning ram and remove the finished pieces adhering to the stripper plate as the cleaning rod descends into the load tube.

6. A molding press as defined in claim 2 wherein the improvement further comprises an injection ram scraping blade connected to the cleaning ram to move in concert with the cleaning ram and remove the cull adhering to the injection ram as the cleaning ram descends into the load tube.

7. A molding press as defined in claim 2 wherein the improvement further comprises a stripper plate scraper blade connected on one side of the cleaning ram and an injection ram scraper blade connected on another side of the cleaning ram, each of the scraper blades moving in concert with the cleaning ram, each of the scraper blades moving in concert with the cleaning ram, such that as the cleaning ram descends into the load tube the stripper plate scraper blade removes the finished pieces adhering to the stripper plate and the injection ram scraper blade removes the cull adhering to the injection ram.

8. A molding press as defined in claim 7 wherein the improvement further comprises a yoke interconnecting the cleaning ram, the stripper plate scraping blade and the injection ram scraping blade; and, an actuating means connected to the yoke to move the cleaning ram and the scraping blades as an integral unit.

9. A molding press as defined in claim 8 wherein the actuating means is activated after each molding cycle of the molding press by a signal that the stripper plate and cavity plate are in a disengaged position, the signal causing the actuating means to move in a first direction to descent the cleaning ram into the load tube and cause the stripper plate scraping blade to remove the finished pieces from the stripper plate and the injection ram scraping blade to remove the cull from the injection ram.

10. A molding press as defined in claim 9 wherein the signal that the stripper plate and cavity plate are in a disengaged position also actuates the fluid injection means.

References Cited

UNITED STATES PATENTS

| | | | |
|---|---|---|---|
| 2,477,258 | 7/1949 | MacMillin | 18—30 |
| 3,128,502 | 4/1964 | Johnson et al. | 18—30 |
| 3,137,038 | 6/1964 | Maynard | 18—30 |
| 3,346,917 | 10/1967 | Lennox | 18—12 |

H. A. KILBY, Jr., Primary Examiner